United States Patent
Kim et al.

(10) Patent No.: US 8,509,467 B2
(45) Date of Patent: Aug. 13, 2013

(54) HUMAN BODY SOUND TRANSMISSION SYSTEM AND METHOD FOR TRANSMITTING A PLURALITY OF SIGNALS

(75) Inventors: Sung-Eun Kim, Seoul (KR); Jung Hwan Hwang, Daejeon (KR); Tae Wook Kang, Daejeon (KR); Sung Weon Kang, Daejeon (KR); Tae Young Kang, Seoul (KR); Kyung-Soo Kim, Daejeon (KR); Jung Bum Kim, Daejeon (KR); Jin Kyung Kim, Daejeon (KR); Kyung Hwan Park, Daejeon (KR); Hyung Il Park, Daejeon (KR); In Gi Lim, Daejeon (KR); Byoung Gun Choi, Daegu (KR); Chang Hee Hyoung, Daejeon (KR); Seok Bong Hyun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 379 days.

(21) Appl. No.: 12/845,134

(22) Filed: Jul. 28, 2010

(65) Prior Publication Data
US 2011/0026741 A1    Feb. 3, 2011

(30) Foreign Application Priority Data

Jul. 29, 2009 (KR) .................. 10-2009-0069525
Jul. 21, 2010 (KR) .................. 10-2010-0070426

(51) Int. Cl.
*H04R 25/00* (2006.01)

(52) U.S. Cl.
USPC ........... 381/316; 381/151; 381/315; 381/326; 455/100

(58) Field of Classification Search
USPC .................. 381/151, 315, 316, 326; 455/100
See application file for complete search history.

(56) References Cited

U.S. PATENT DOCUMENTS

| | | | |
|---|---|---|---|
| 8,300,864 B2* | 10/2012 | Mullenborn et al. ......... 381/315 |
| 2004/0202339 A1 | 10/2004 | O'Brian, Jr. et al. |
| 2006/0143004 A1 | 6/2006 | Kim et al. |
| 2006/0277114 A1 | 12/2006 | Ishibashi et al. |
| 2010/0119080 A1 | 5/2010 | Kim et al. |

FOREIGN PATENT DOCUMENTS

| | | |
|---|---|---|
| CN | 1866773 A | 11/2006 |
| JP | 2004-134936 A | 4/2004 |
| JP | 2007-020059 A | 1/2007 |
| WO | WO 2008/136580 A1 | 11/2008 |
| WO | WO 2009/104862 A1 | 8/2009 |
| WO | WO 2010/013873 A1 | 2/2010 |

* cited by examiner

*Primary Examiner* — Ramon Barrera

(57) ABSTRACT

There are provided a human body sound transmission system and a method. The human body sound transmission system according to an aspect of the present invention directly or indirectly contacts a human body to apply coupled signals of high frequency sound signals with high frequency signals, which recover sound signals from the high frequency sound signals, to the human body and transmit the sound signals using the human body as a transmission medium, wherein a magnitude of the sound signals recovered around a human's ear is increased in proportion to the number of signals transmitted through the human body by transmitting the plurality of signals including the same sound signals through the human body.

13 Claims, 3 Drawing Sheets

HUMAN BODY SOUND TRANSMISSION SYSTEM AND METHOD FOR TRANSMITTING A PLURALITY OF SIGNALS

CROSS-REFERENCE TO RELATED APPLICATIONS

This application claims the priorities of Korean Patent Application Nos. 10-2009-0069525 filed on Jul. 29, 2009 and 10-2010-0070426 filed on Jul. 21, 2010 in the Korean Intellectual Property Office, the disclosures of which are incorporated herein by reference.

BACKGROUND OF THE INVENTION

1. Field of the Invention

The present invention relates to a human body sound transmission system and method, and more particularly, to a technology capable of maximizing a magnitude of recovered sounds while minimizing a magnitude of each of the transmitted signals, by transmitting a plurality of signals including the same sound signals through a human body.

2. Description of the Related Art

A human body sound transmission technology transmits a sound signal using a human body as a transmission medium. When sound signals modulated into signals of a high frequency band and high frequency signals for demodulating the sound signals are applied to the human body, the frequency of the modulated sound signals and the frequency of the high frequency signals are mixed due to the nonlinear effect of the human body while being transmitted through the human body, thereby generating the sound signals. Therefore, the sound signals can be transmitted and recovered without a cable and a separate receiving apparatus.

However, in order to increase the magnitude of the sound signal generated around the user's ear, the magnitude of the transmitted signal should be sufficiently large. This depends on the performance of the sound transmission apparatus. Therefore, when a signal having a sufficiently large magnitude cannot be transmitted due to the degradation in the performance of the sound transmission apparatus being utilized, there is a problem in that it is difficult to apply the human body sound transmission technology.

SUMMARY OF THE INVENTION

An aspect of the present invention provides a human body sound transmission system and method capable of maximizing a magnitude of recovered sounds and minimizing distortion of signals transmitted through a human body due to external signals while minimizing a magnitude of each of the transmitted signals, by transmitting a plurality of signals including the same sound signals through a human body.

According to an aspect of the present invention, there is provided a human body sound transmission system directly or indirectly contacting a human body to apply coupled signals of high frequency sound signals with high frequency signals, which recover sound signals from the high frequency sound signals, to the human body and transmit sound signals using the human body as a transmission medium, wherein a magnitude of the sound signals recovered around a human's ear is increased in proportion to the number of signals transmitted through the human body by transmitting the plurality of signals including the same sound signals through the human body.

According to another aspect of the present invention, there is provided a human body sound transmission method, including: generating sound signal and high frequency signal; generating high frequency sound signal by synthesizing the sound signal with the high frequency signal; coupling the high frequency sound signal with the high frequency signal; amplifying the coupled signal; generating a plurality of signals having the same magnitude, phase, and frequency as the amplified signal; and applying the plurality of signals to the human body.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
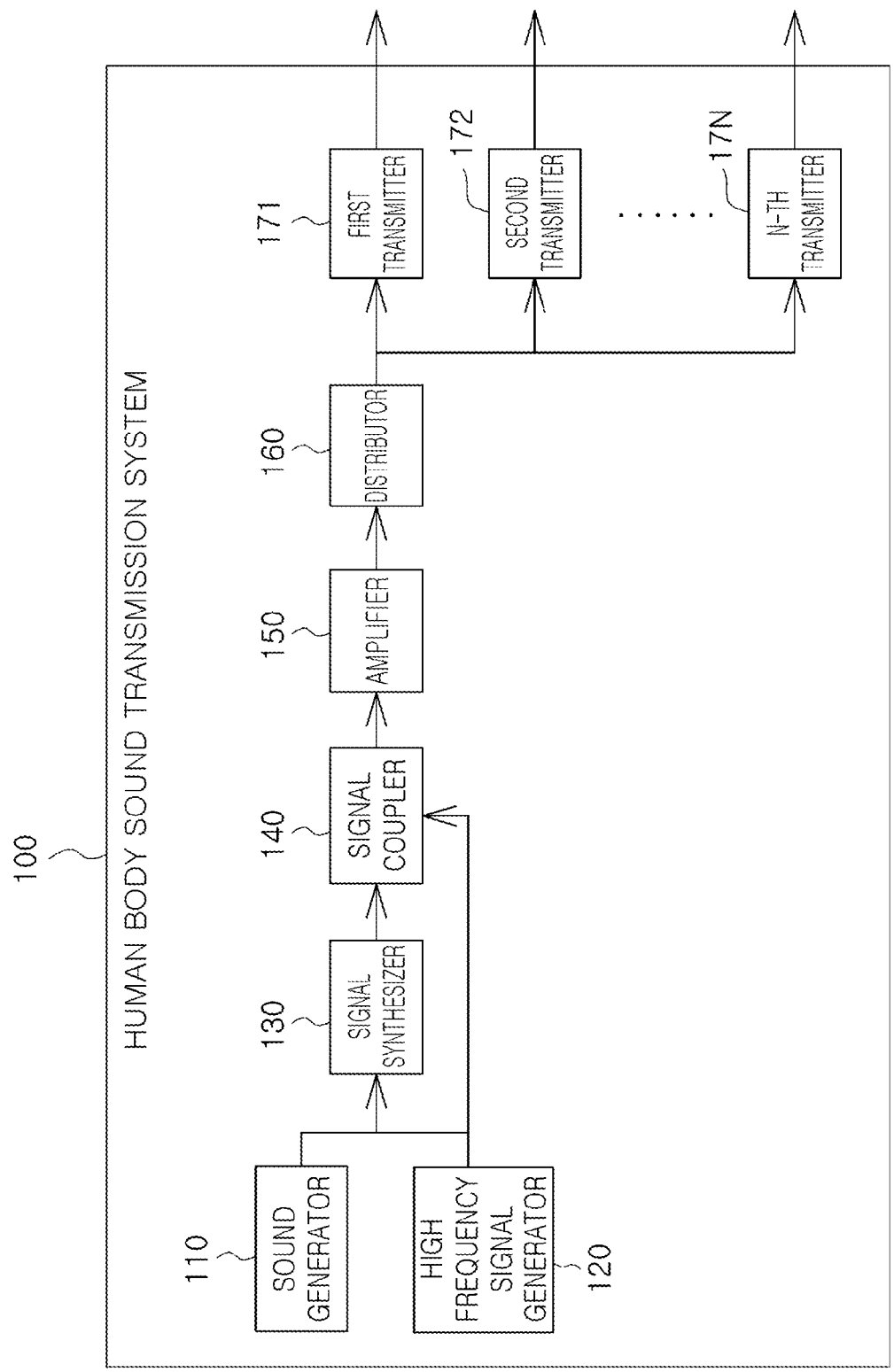
FIG. 1 is a configuration diagram of a human body sound transmission system according to an exemplary embodiment of the present invention.

Hereinafter, exemplary embodiments will be described in detail with reference to the accompanying drawings so that they can be easily practiced by those skilled in the art to which the present invention pertains. However, in describing the exemplary embodiments of the present invention, detailed descriptions of well-known functions or constructions are omitted so as not to obscure the description of the present invention with unnecessary detail. In addition, like reference numerals denote parts performing similar functions and actions throughout the drawings.

Throughout this specification, when it is described that an element is "connected" to another element, the element may be "directly connected" to another element or "indirectly connected" to another element through a third element. In addition, unless explicitly described otherwise, "comprising" any components will be understood to imply the inclusion of other components but not the exclusion of any other components.

A human body sound transmission system according to the present invention is a system that transmits sound signals using a human body as a transmission medium. The human body sound transmission system is configured to transmit the plurality of signals including the same sound signals through the human body. Therefore, a magnitude of each of the signals transmitted through the human body is ever reducing in inverse proportion to the number of transmitted signals (N number), while the magnitude of signals that are transmitted and finally recovered through the human body may be maintained to be large.

In other words, the plurality of sound signals that are transmitted and recovered through the human body suffer from constructive inference with each other, such that the magnitude of the recovered sound signals is ever increasing in proportion to the number of transmitted signals (N number).

Meanwhile, the plurality of signals that are transmitted through the human body are transmitted around the user's ear through one channel called "human body." Therefore, in order to minimize the occurrence of the mutual interference before the plurality of signals transmitted through the human body arrive around the user's ear, each of the transmitted signals should be generated by using different signal synthesizing methods and different high frequency signals synthesized with the sound signals.

Further, the human body sound transmission system contacts the human body, such that it is configured to apply the coupled signals of the high frequency sound signals, which are generated by synthesizing the sound signals with the high frequency signals, and the high frequency signals, which recover the sound signals from the high frequency sound signals transmitted through the human body, to the human body. The frequencies of the high frequency sound signals and the high frequency signals, which are applied to the human body, are mixed with each other due to the nonlinear effect of the human body, thereby generating the sound signals.

In addition, the present invention may be equally applied to both the case in which the plurality of signals including the same sound signals are transmitted and the case in which two or more sound signals are transmitted. In this case, stereophonic sound can be implemented.

Hereinafter, a configuration of the human body sound transmission system according to various exemplary embodiments of the present invention will be described with reference to FIGS. 1 to 3.

FIG. 1 is a configuration diagram of the human body sound transmission system according to an exemplary embodiment of the present invention.

A human body sound transmission system 100 according to an exemplary embodiment of the present invention is configured to include a sound generator 110, a high frequency signal generator 120, a signal synthesizer 130, a signal coupler 140, an amplifier 150, a distributor 160, and a plurality of transmitters 171, 172, and 17N and may be implemented as a hand-held type.

The sound generator 110 generates the sound signals in an audible frequency band including data to be transmitted.

The high frequency signal generator 120 generates high frequency signals that will be coupled with the sound signals generated from the sound generator 110. The high frequency signal generator 120 may generate ultrasonic signals having a frequency band higher than a human's audible frequency band (20 Hz to 20 kHz).

The signal synthesizer 130 synthesizes the sound signals generated by the sound generator 110 with the high frequency signal generated by the high frequency signal generator 120, thereby making it possible to generate the high frequency sound signals and if necessary, control the phase of the synthesized high frequency sound signals. For example, the signal synthesizer 130 may generate the high frequency sound signals by using an amplitude modulation (AM) method, or the like.

The signal coupler 140 couples the high frequency sound signals generated by the signal synthesizer 130 with the high frequency signals generated by the high frequency signal generator 120.

The amplifier 150 is optionally provided as needed, which amplifies the signals coupled in the signal coupler 140 to increase the output level of the signals. This is to prevent the signals from being attenuated due to noise during the transmission of the signals through the human body.

The distributor 160 receives the signals amplified in the amplifier 150 to generate the plurality of signals having the same magnitude, phase, and frequency as the amplified signals and transmit them to each of the plurality of transmitters 171, 172, and 17N.

The plurality of transmitters 171, 172, and 17N applies the signals transmitted from the distributor 160 to the human body. Each of the plurality of transmitters 171, 172, and 17N directly and indirectly contacts the human body and applies the signals transmitted from the distributor 160 to the human body and transmits the signals through the human body. To this end, each transmitter 171, 172, and 17N acoustically couples the human body sound transmission system 100 with the human body. Further, each transmitter 171, 172, and 17N serves as a type of a transducer that converts signals to be transmitted into vibration type signals and transmits them to the human body.

Further, although not shown in FIG. 1, the human body sound transmission system 100 further includes a sensor (not shown) that performs a sensing function and may further include components that measure a distance between a portion contacting the human body and left and right ears and the impedance of the human body and perform a control to adapt them to signal transmission.

In addition, although FIG. 1 shows the case in which the human body sound transmission system 100 includes both the sound generator 110 and the high frequency signal generator 120, the human body sound transmission system 100 uses the sound signal and the high frequency signal transmitted from the outside without the human body sound transmission system 100 directly generating the sound signal and the high frequency signal, such that it may be implemented to transmit the plurality of signals by performing processes such as signal synthesis, signal coupling, signal distribution, and the like.

In addition, when the human body sound transmission system 100 implements stereophonic sound by transmitting two or more sound signals, it includes two or more sound generators 110 and performs processes, such as signal synthesis, signal coupling, signal distribution, or the like, each of the sound signals generated by the sound generator 110 to transmit the plurality of signals for each sound signal.

Figure 2:
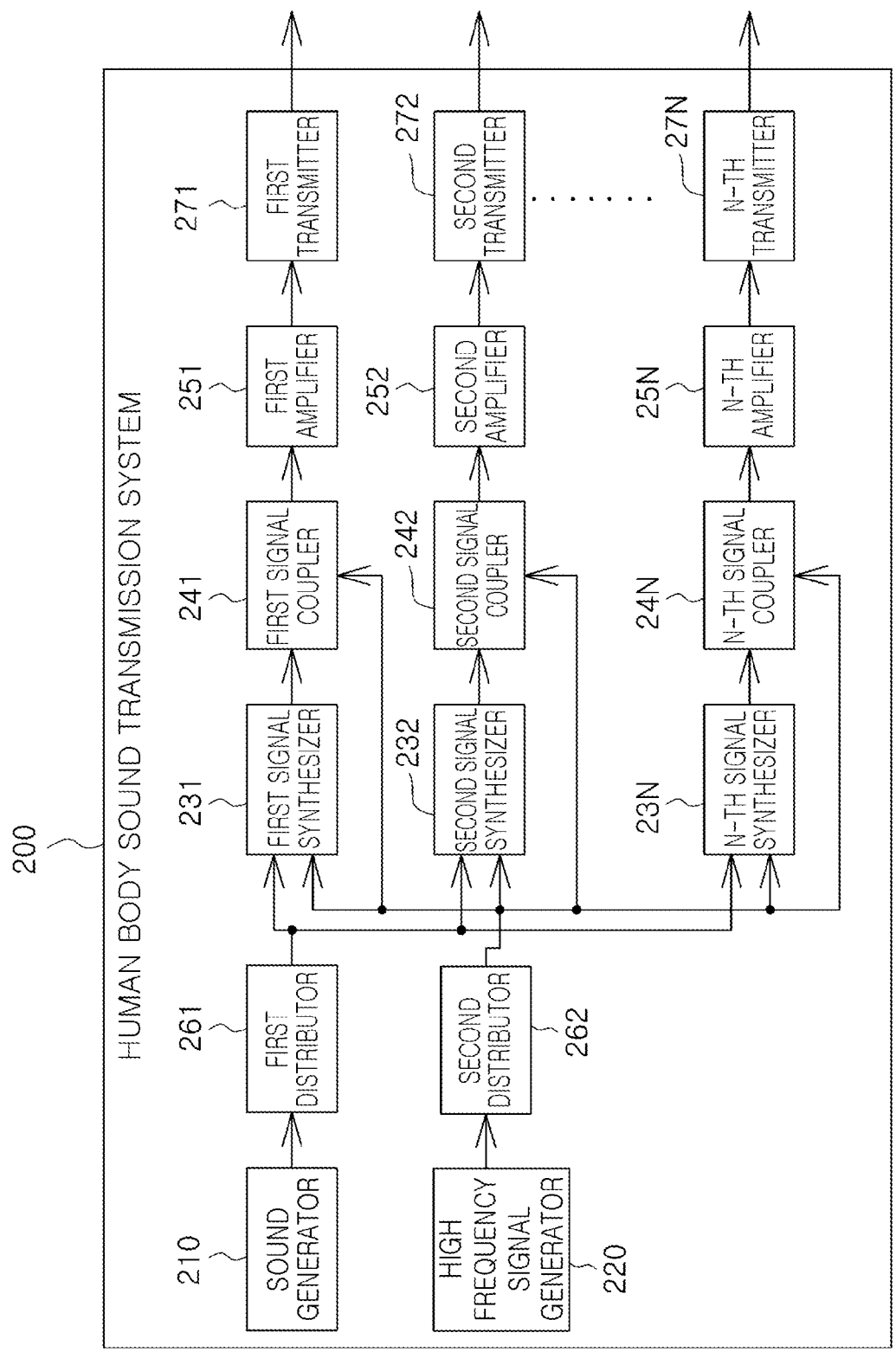
FIG. 2 is a configuration diagram of a human body sound transmission system according to another exemplary embodiment of the present invention.

FIG. 2 is a configuration of a human body sound transmission system according to another exemplary embodiment of the present invention. In more detail, FIG. 2 shows the human body sound transmission system configured to generate the high frequency sound signals included in the plurality of signals according to the different synthesizing methods (that is, modulation methods) in order to minimize the interference among the plurality of signals transmitted through the human body.

A human body sound transmission system 200 according to another exemplary embodiment of the present invention is configured to include a sound generator 210, a high frequency signal generator 220, a plurality of signal synthesizers 231, 232, and 23N, a plurality of signal couplers 241, 242, 24N, a plurality of amplifiers 251, 252, and 25N, first and second distributors 261 and 262, and a plurality of transmitters 271, 272, and 27N and may be implemented as a hand-held type.

The sound generator 210 generates the sound signals in an audible frequency band including data to be transmitted.

The high frequency signal generator 220 generates high frequency signals that will be coupled with the sound signals generated by the sound generator 210. The high frequency signal generator 220 may generate ultrasonic signals having a frequency band higher than a human's audible frequency band (20 Hz to 20 kHz).

The first distributor 261 receives the sound signals generated by the sound generator 210 to generate the plurality of signals that are the same as the received sound signals and transmit them to each of the plurality of signal synthesizers 231, 232, and 23N. Further, the second distributor 262 receives the high frequency signals generated by the high frequency signal generator 220 to generate the plurality of high frequency signals that are the same as the received high frequency signals and transmit them to the plurality of signal synthesizers 231, 232, and 23N and the plurality of signal couplers 241, 242, and 29N, respectively.

Each of the plurality of signal synthesizers 231, 232, and 23N synthesizes the sound signals transmitted from the first distributor 261 with the high frequency signals transmitted from the second distributor 262, thereby making it possible to generate the high frequency sound signals and control the phase of the synthesized high frequency sound signals as needed. In this case, the plurality of signal synthesizers 231, 232, and 23N are configured to generate the high frequency sound signals by using the different synthesizing methods (that is, modulation methods). For example, if it is assumed that the first signal synthesizer 231 is configured to generate the high frequency sound signals by using an amplitude modulation (AM) method, the second signal synthesizer 232 is configured to generate the high frequency sound signals by using a modulation method other than the amplitude modulation method and the N-th signal synthesizer 23N is configured to generate the high frequency sound signals by using another modulation method.

Each of the plurality of signal couplers 241, 242, and 24N couples each of the plurality of high frequency sound signals generated by each of the plurality of signal synthesizers 231, 232, and 23N with each high frequency signal transmitted from the second distributor 262.

The plurality of amplifiers 251, 252, and 25N are optionally provided as needed. Each amplifier amplifies the signals coupled in the plurality of signal couplers 241, 242, and 24N to increase the output level of the signals.

Each of the plurality of transmitters 271, 272, and 27N applies the signals transmitted from each of the plurality of amplifiers 251, 252, and 25N to the human body. Each of the plurality of transmitters 271, 272, and 27N directly and indirectly contacts the human body and applies the signals transmitted from the plurality of amplifiers 251, 252, and 25N to the human body and transmits them through the human body. To this end, each transmitter 271, 272, and 27N acoustically couples the human body sound transmission system 200 with the human body. Further, each transmitter 171, 172, and 17N serves as a type of a transducer that converts signals to be transmitted into vibration type signals and transmits them to the human body.

Similar to the description with reference to FIG. 1, even in the case of the exemplary embodiment, the human body sound transmission system 200 may use the sound signal and the high frequency signal transmitted from the outside without the human body sound transmission system 200 directly generating the sound signal and the high frequency signal and includes two or more sound generators 210 to transmit two or more sound signals, thereby making it possible to implement the stereophonic sound.

Figure 3:
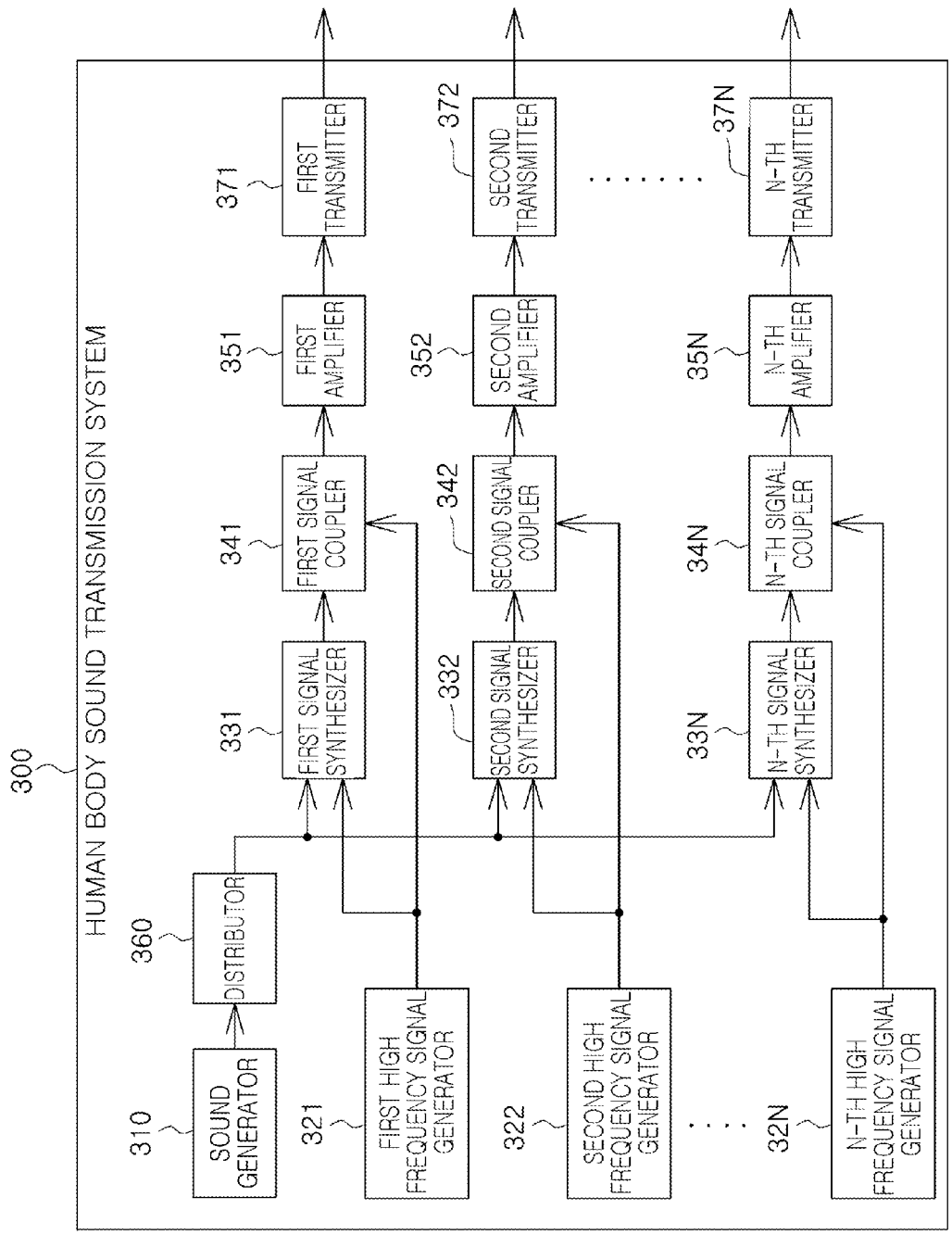
FIG. 3 is a configuration diagram of a human body sound transmission system according to another exemplary embodiment of the present invention.

FIG. 3 is a configuration of a human body sound transmission system according to another exemplary embodiment of the present invention. In more detail, FIG. 3 shows the human body sound transmission system configured to generate the plurality of signals by using the high frequency signals having different phases and sizes or different frequency bands in order to minimize the interference among the plurality of signals transmitted through the human body.

A human body sound transmission system 300 according to another exemplary embodiment of the present invention is configured to include a sound generator 310, a plurality of high frequency signal generators 321, 322, and 32N, a plurality of signal synthesizers 331, 332, and 33N, a plurality of signal couplers 341, 342, 34N, a plurality of amplifiers 351, 352, and 35N, a distributor 360, and a plurality of transmitters 371, 372, and 37N and may be implemented as a hand-held type.

The sound generator 310 generates the sound signals in an audible frequency band including data to be transmitted.

Each of the plurality of high frequency signal generators 321, 322, and 32N generates the high frequency signals that will be coupled with the sound signals generated by the sound generator 310. In this case, the plurality of high frequency signal generators 321, 322, and 32N are configured to generate the high frequency signals having different phases and sizes or generate the high frequency signals having different frequency bands.

The distributor 360 receives the sound signals generated by the sound generator 310 to generate the plurality of signals that are the same as the received sound signals and transmit them to each of the plurality of signal synthesizers 331, 332, and 33N.

Each of the plurality of signal synthesizers 331, 332, and 33N synthesizes the sound signals transmitted from the distributor 360 with the high frequency signals transmitted from any one of the plurality of high frequency signal generators 321, 322, and 32N, thereby making it possible to generate the high frequency sound signals and control the phase of the synthesized high frequency sound signals as needed. In this case, the plurality of signal synthesizers 331, 332, and 33N may be configured to generate the high frequency sound signals by using the same or, different synthesizing methods (that is, modulation methods).

Each of the plurality of signal couplers 341, 342, and 34N couples each high frequency sound signal generated by each of the plurality of signal synthesizers 331, 332, and 33N with each high frequency signal transmitted from any one of the plurality of high frequency signal generators 321, 322, and 32N.

The plurality of amplifiers 351, 352, and 35N are optionally provided as needed. Each amplifier amplifies the signals coupled in the plurality of signal couplers 341, 342, and 34N to increase the output level of the signals.

Each of the plurality of transmitters 371, 372, and 37N applies the signals transmitted from each of the plurality of amplifiers 351, 352, and 35N to the human body. Each of the plurality of transmitters 371, 372, and 37N directly and indirectly contacts the human body and applies the signals transmitted from the plurality of amplifiers 351, 352, and 35N to the human body and transmits the signals through the human body. To this end, each transmitter 371, 372, and 37N acoustically couples the human body sound transmission system 300 with the human body. Further, each transmitter 371, 372, and 37N serves as a type of a transducer that converts signals to be transmitted into vibration type signals and transmits them to the human body.

Similar to the description with reference to FIG. 1, even in the case of the exemplary embodiment, the human body sound transmission system 300 may use the sound signal and the high frequency signal transmitted from the outside without the human body sound transmission system 300 directly generating the sound signal and the high frequency signal and includes two or more sound generators 310 to transmit two or more sound signals, thereby making it possible to implement the stereophonic sound.

As set forth above, the present invention can maintain a large magnitude of the recovered sound signals while reducing the magnitude of each of the transmitted signals by transmitting the plurality of signals including the same sound signals through the human body. Therefore, even when the performance of the sound transmission apparatus is relatively degraded, the sound can be transmitted by the human body sound transmission technology.

Further, when the plurality of signals to be transmitted through the human body are generated, the present invention synthesizes the sound signals with the high frequency signals by the different signal synthesizing methods or uses the different high frequency signals, thereby making it possible to minimize distortion due to third signals generated from the outside of the human body and minimize interference between the transmitted signals.

While the present invention has been shown and described in connection with the exemplary embodiments, it will be apparent to those skilled in the art that modifications and variations can be made without departing from the spirit and scope of the invention as defined by the appended claims.

What is claimed is:

1. A human body sound transmission system directly or indirectly contacting a human body to apply coupled signals of high frequency sound signals with high frequency signals, which recover sound signals from the high frequency sound signals, to the human body and transmit sound signals using the human body as a transmission medium,
   wherein a magnitude of the sound signals recovered around a human's ear is increased in proportion to the number of signals transmitted through the human body by transmitting the plurality of signals including the same sound signals through the human body.

2. The human body sound transmission system of claim 1, wherein the plurality of signals transmitted through the human body are generated by using different signal synthesizing methods.

3. The human body sound transmission system of claim 1, wherein the plurality of signals transmitted through the human body are generated by synthesis of sound signals with different high frequency signals.

4. The human body sound transmission system of claim 1, further comprising:
   a signal synthesizer configured to synthesize the sound signals with the high frequency signals to generate the high frequency sound signals;
   a signal coupler configured to couple the high frequency sound signals with the high frequency signals;
   a distributor configured to receive the signals coupled by the signal coupler and generate and output the plurality of signals having the same magnitude, phase, and frequency as the input signals; and
   a plurality of transmitters configured to receive the signals output from the distributor, respectively, and apply the received signals to the human body.

5. The human body sound transmission system of claim 4, further comprising:
   a sound generator configured to generate the sound signals in an audible frequency band in which data to be transmitted are included and output the generated sound signals to the signal synthesizer;
   a high frequency signal generator configured to generate the high frequency signals and output the generated high frequency signals to the signal synthesizer and the signal coupler; and
   an amplifier configured to amplify the signals coupled by the signal coupler and output the amplified signals to the distributor.

6. The human body sound transmission system of claim 2, further comprising:
   a first distributor configured to receive the sound signals and generate and output a plurality of signals that are the same as the input signals;
   a second distributor configured to receive the high frequency signals and generate and output a plurality of high frequency signals that are the same as the input signals;
   a plurality of signal synthesizers configured to synthesize the sound signals transmitted from the first distributor with the high frequency signals transmitted from the second distributor by using different signal synthesizing methods to generate the high frequency sound signals;
   a plurality of signal couplers configured to couple each of the high frequency sound signals generated by the plurality of signal synthesizers with any one of the high frequency signals transmitted from the second distributor; and
   a plurality of transmitters configured to receive respective signals output from the plurality of signal couplers and apply the received signals to the human body.

7. The human body sound transmission system of claim 6, further comprising:
   a sound generator configured to generate the sound signals in an audible frequency band including data to be transmitted and output the generated sound signals to the first distributor;
   a high frequency signal generator configured to generate and output the high frequency signals to the second distributor; and
   a plurality of amplifiers configured to amplify the signals coupled by the plurality of signal couplers and output the amplified signals to the plurality of transmitters, respectively.

8. The human body sound transmission system of claim 3, further comprising:
   a distributor configured to receive the sound signals and generate and output a plurality of signals that are the same as the input signals;
   a plurality of signal synthesizers configured to synthesize the sound signals transmitted from the distributor with any one of the different high frequency signals to generate the high frequency sound signals;
   a plurality of signal couplers configured to couple each of the high frequency sound signals generated by the plurality of signal synthesizers with any one of the different high frequency signals; and
   a plurality of transmitters configured to receive respective signals output from the plurality of signal couplers and apply the received signals to the human body.

9. The human body sound transmission system of claim 8, further comprising:
   a sound generator configured to generate the sound signals in an audible frequency band in which data to be transmitted are included and output the generated sound signals to the distributor;
   a plurality of high frequency signal generators configured to generate the different high frequency signals and output the generated high frequency signals to the plurality of signal synthesizers and the plurality of signal couplers; and
   a plurality of amplifiers configured to amplify the signals coupled by the plurality of signal couplers and output the amplified signals to each of the plurality of transmitters.

10. The human body sound transmission system of claim 1, wherein each of the plurality of signals generated for two or more sound signals is transmitted through the human body to implement stereophonic sound.

11. A human body sound transmission method, comprising:
- generating a sound signal and a high frequency signal;
- generating high frequency sound signal by synthesizing the sound signal with the high frequency signal;
- coupling the high frequency sound signal with the high frequency signal;
- amplifying the coupled signal;
- generating a plurality of signals having the same magnitude, phase, and frequency as the amplified signal; and
- applying the plurality of signals to the human body,
- wherein a magnitude of the sound signals recovered around a human's ear is increased in proportion to the number of signals transmitted through the human body by transmitting the plurality of signals including the same sound signals through the human body.

12. A human body sound transmission method, comprising:
- generating sound signal and high frequency signal;
- generating a plurality of sound signals and a plurality of high frequency signals that are the same as the sound signal and the high frequency signal;
- generating a plurality of high frequency sound signals by synthesizing the plurality of sound signals with the plurality of high frequency signals, respectively, by using different signal synthesizing methods;
- coupling the plurality of high frequency sound signals with the plurality of high frequency signals, respectively;
- amplifying the plurality of coupled signals; and
- applying the plurality of amplified signals to the human body, respectively.

13. A human body sound transmission method, comprising:
- generating sound signal and a plurality of different high frequency signals;
- generating a plurality of sound signals that are the same as the sound signal;
- generating a plurality of high frequency sound signals by synthesizing the plurality of sound signals with the plurality of high frequency signals, respectively;
- coupling the plurality of high frequency sound signals with the plurality of high frequency signals, respectively;
- amplifying the plurality of coupled signals; and
- applying the plurality of amplified signals to the human body, respectively.

* * * * *